No. 619,621. Patented Feb. 14, 1899.
C. L. ROSENQVIST.
ALTERNATING CURRENT ELECTRIC MOTOR.
(Application filed June 19, 1893.)

(No Model.) 5 Sheets—Sheet 1.

Fig. 1.

Attest:
C. W. Benjamin.
W. N. Capel.

Inventor:
Conrad. L. Rosenqvist,
by H. C. Townsend
atty.

No. 619,621. Patented Feb. 14, 1899.
C. L. ROSENQVIST.
ALTERNATING CURRENT ELECTRIC MOTOR.
(Application filed June 19, 1893.)

(No Model.) 5 Sheets—Sheet 2.

Fig. 2.

Attest:
C. W. Benjamin
W. N. Capel

Inventor,
Conrad L. Rosenqvist,
by H. L. Townsend
atty

No. 619,621. Patented Feb. 14, 1899.
C. L. ROSENQVIST.
ALTERNATING CURRENT ELECTRIC MOTOR.
(Application filed June 19, 1893.)
(No Model.) 5 Sheets—Sheet 4.

Attest:
C. W. Benjamin
Wm. H. Capel

Inventor,
Conrad L. Rosenqvist,
by H. L. Townsend
atty

No. 619,621. Patented Feb. 14, 1899.
C. L. ROSENQVIST.
ALTERNATING CURRENT ELECTRIC MOTOR.
(Application filed June 19, 1893.)
(No Model.) 5 Sheets—Sheet 5.

Fig. 8.

Witnesses:
C. L. Belcher
H. N. Capel

Inventor
Conrad L. Rosenqvist
By
Attorney

UNITED STATES PATENT OFFICE.

CONRAD L. ROSENQVIST, OF NEW YORK, N. Y., ASSIGNOR TO THE EXCELSIOR ELECTRIC COMPANY, OF SAME PLACE.

ALTERNATING-CURRENT ELECTRIC MOTOR.

SPECIFICATION forming part of Letters Patent No. 619,621, dated February 14, 1899.

Application filed June 19, 1893. Serial No. 478,043. (No model.)

*To all whom it may concern:*

Be it known that I, CONRAD L. ROSENQVIST, a citizen of the United States, and a resident of New York, (Brooklyn,) in the county of Kings and State of New York, have invented certain new and useful Improvements in Alternating-Current Electric Motors, of which the following is a specification.

My invention relates to alternating-current motors, and more particularly to motors which develop power to the most efficient degree when run at what is termed a "speed synchronous with the alternations." As is well known, motors of this class are not self-starting, or, if capable of self-starting, do not operate with the highest efficiency at first, but only upon the attainment of a certain speed at which the changes in the presentation of armature and field-poles keep step with the reversals of the alternating current.

One part of my invention relates to the manner of combining a non-synchronous motor or motor system with such a synchronous motor, whereby the machine may be brought up to the desired speed by the action of alternating currents giving a torque or motive effect irrespective of the speed of revolution, after which the motor is thrown into condition for the best operation as a synchronous motor. To enable this change to be readily effected, I combine, with the apparatus, an electromagnet which is placed in a circuit carrying a current which is responsive to or varies with the speed of the motor, operating as a non-synchronous motor and adjusted to operate when the critical or desired synchronous speed is reached. By preference I place this magnet in the circuit with the armature of an exciter, which is driven by the motor itself, but it might be placed in any other proper circuit—as, for instance, in a circuit connected into or with the armature-coils of the starting or non-synchronous motor or portion of the machine—as will be hereinafter more particularly described. The magnet being adjusted to operate or respond when the motor reaches the desired critical speed, the action of said magnet may be employed either to operate a bell or other indicating appliance, giving the attendant notice that he may change the operation of the machine to that of a synchronous motor, or the said magnet may be used to automatically produce the desired change.

Another feature of my invention relates to the construction of the armature for an alternating-current motor and is designed to produce increased efficiency for a given amount of material in the machine.

An alternating-current motor with a smooth iron core for the armature can be made to work, but requires too great energy to create the desired amount of magnetism in armature and field, owing to the existence of the great air-space between the core of the armature and the field. A motor of this construction will have to be very large, therefore, for its output. When the armature of an alternating motor is made with as many polar projections and grooves for the winding as the field-magnets have poles, it will work, but not very effectively, because the motion of the armature as the poles of the latter leave the poles of the field will be retarded, owing to the fact that there is no other good path for the magnetic lines of force emanating from the field-magnets. To avoid this retarding tendency, I propose to provide one or more polar projections between the larger ones, said intermediate projections serving to carry the magnetism from the field without hindering the armature in its motion. These polar projections, as will be readily understood, may be provided between the sections of the coil which is used for energizing the larger poles if the armature be wound with coils upon its ring portion instead of upon the projections.

My invention consists also in the subdivision of the coils of a synchronous motor-armature into sections which are individually employed as the coils for a starting or non-synchronous motor system. By this provision the starting of the non-synchronous motor is assisted as a number of poles between the several sections are furnished that avoid a dead-point and allow the armature to start from any position.

My invention consists, further, in the combinations and detail features of construction hereinafter more particularly described and then specified in the claims.

In the accompanying drawings.

Figure 1:
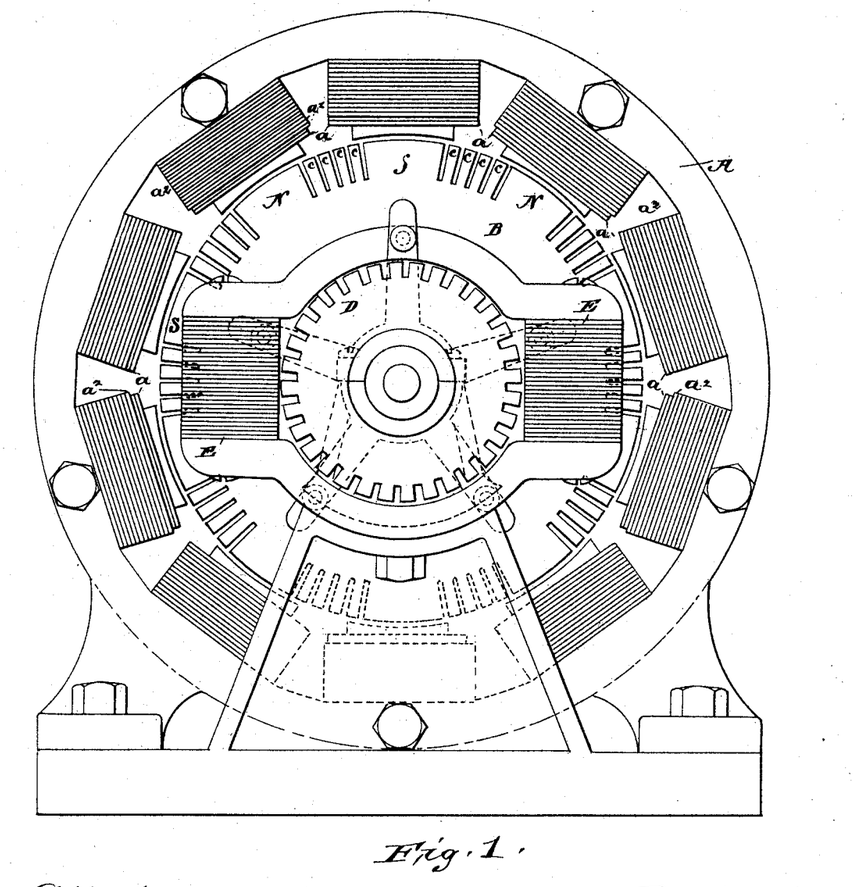
Figure 1 shows an end elevation of a form of machine adapted for the carrying out of my invention. In this figure the coils are omitted from the armatures in order to better illustrate the invention.
Figure 2:
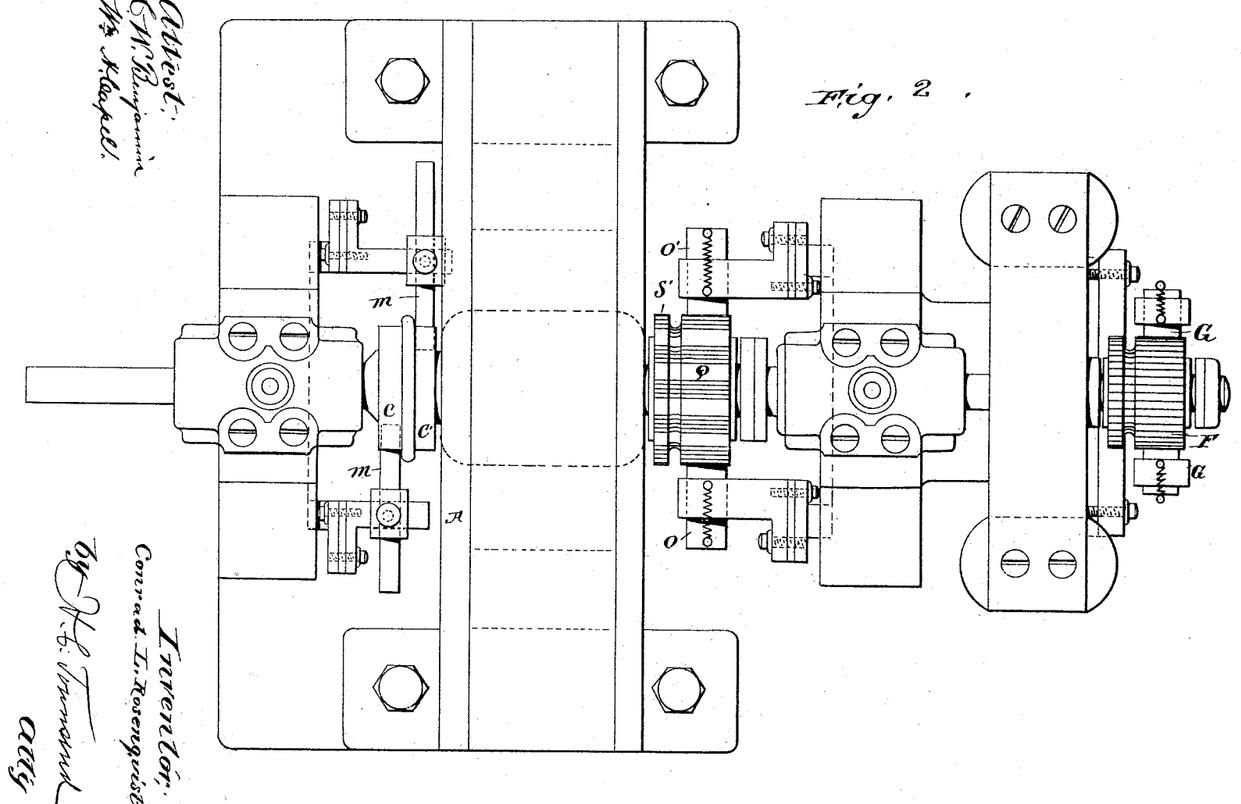
Fig. 2 is a plan of the machine.
Figure 3:
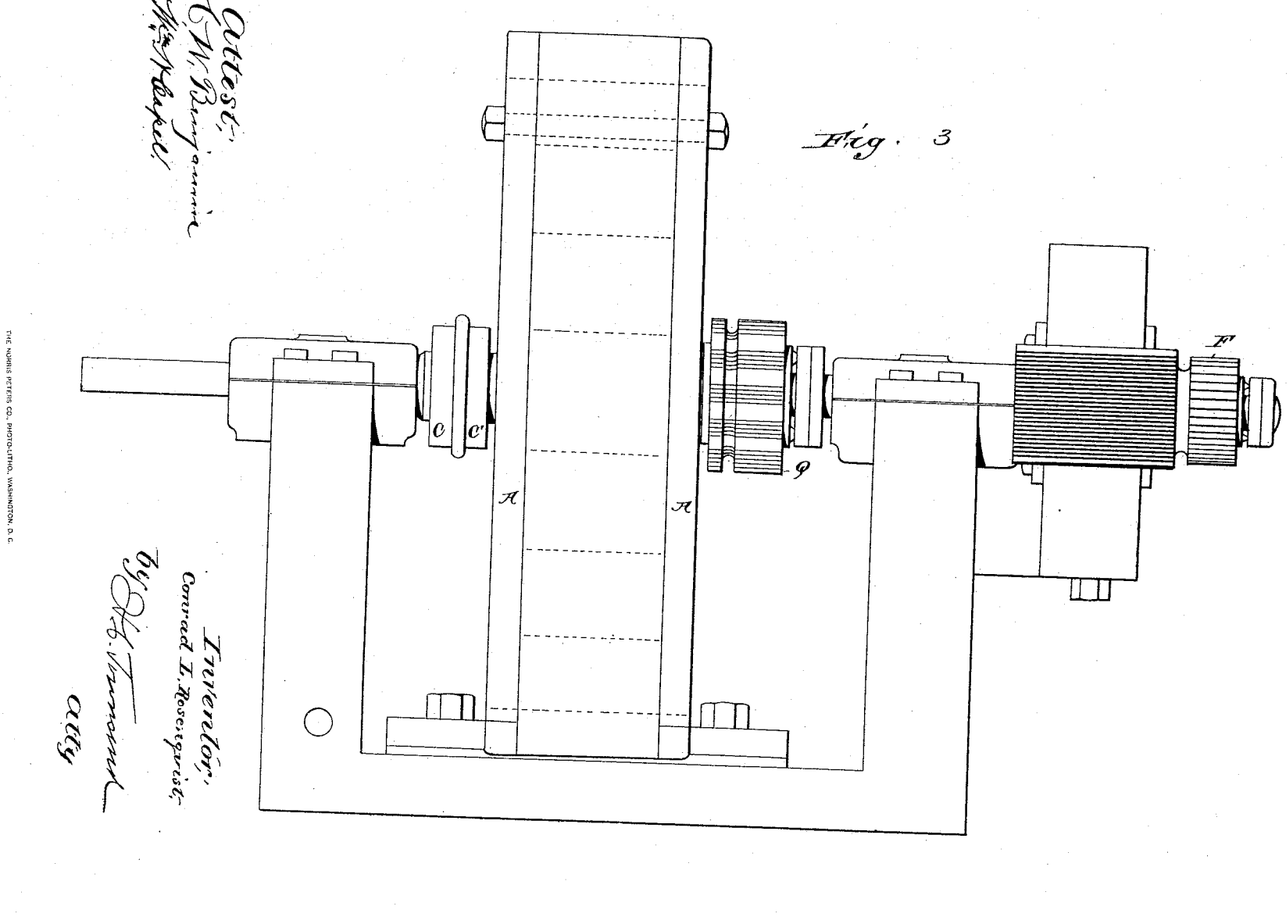
Fig. 3 is a side elevation thereof.
Figure 4:
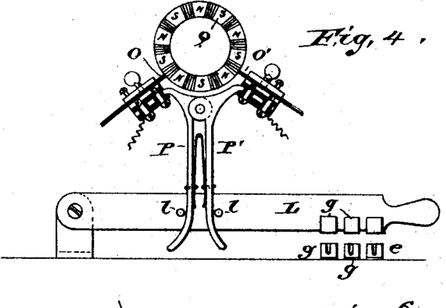
Fig. 4 shows in side elevation the commutator and switch for starting the non-synchronous portion of the apparatus.
Figure 6:
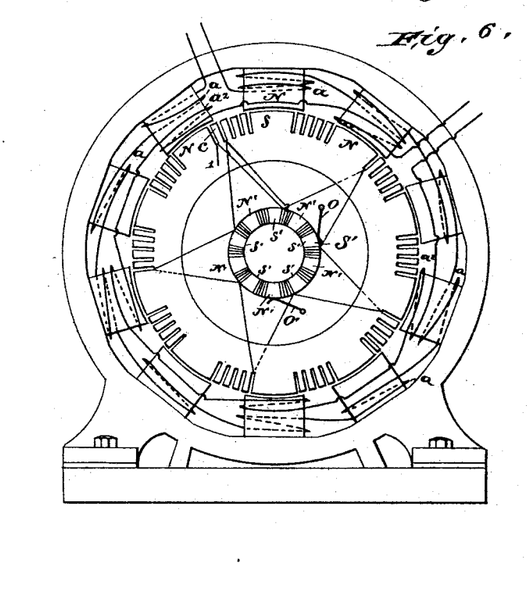
Fig. 6 is a diagrammatic illustration of the winding of the machine.

A indicates the field-magnet of the alternating-current motor to which coils $a$ may be applied in any desired manner and connected up, as usual in the art. In the present instance the exciting-coils are shown as wound upon polar projections in the usual manner. They are wound and connected with one another after the manner illustrated in Fig. 6 and may be charged with direct current derived from any suitable source, either from an alternating-current source or from a suitable continuous-current exciter; but by preference I employ a continuous-current exciter which is connected to said coils when synchronism is established and is maintained in continuous operation by the alternating-current motor when operating synchronously. When the motor is started, the field-magnet A may be employed as a part of the non-synchronous starting-motor and may be then excited in any desired way, but by preference I employ a separate set of exciting-coils, (indicated at $a^2$.) These coils may be wound on every other polar projection, as indicated in Figs. 1 and 6, and connected, as shown, with the result of giving poles alternately north and south in the field. As will be obvious any desired number of poles may be used in the field, although in the present case the field is shown as having ten poles.

B is the armature-core of the alternating-current motor.

The poles of the armature which operate with the field-poles in the synchronous operation are indicated by the letters N S. In the spaces between the poles N S a number of smaller polar projections are provided, as shown, and as indicated by the letters $c$. While I have shown four intermediate polar projections $c$ in each space, a greater or less number might be employed, if desired. The poles N S of the armature may be developed by coils applied on the armature in any desired manner; but by preference I employ coils wound in ring fashion around the annular core in the spaces between the poles N S. These coils are wound in subdivisions in the smaller spaces between the poles $c$, the effect being, as will be obvious, to subdivide each coil into a number of sections between which the poles may be developed by the individual action of said sections when the latter are brought into circuit through the operation of a commutator, with which the said sections are properly connected to permit a non-synchronous operation under the effect of alternating currents. As a number of series of poles are thus provided for non-synchronous action between the larger poles, it will be obvious that the armature may be more readily started and a dead-point avoided.

The polar projections $c$ furnish a path for the magnetism hereinbefore referred to, which allows the larger poles N S to readily leave the field-magnet poles. I have found by actual test that by this provision of mass of iron furnishing a path for the magnetism at the points shown a very great increase in the efficiency of the motor operating as a synchronous motor is attained.

In the operation of the motor as a synchronous motor all of the wire wound in the several spaces between any two adjoining larger poles N S operates as a single coil, each such subdivided coil being connected to the adjoining coils in the ordinary manner; but for non-synchronism or starting purposes the several subdivisions in the spaces between the larger poles N S are individually connected to a commutator, and thus adapted for non-synchronous operation under the action of alternating currents.

The manner of connection of the coils to the commutator-segments may be after any desired fashion. One way of winding and connecting them is indicated in Fig. 6, where the commutator-segments are shown in end elevation and are each of a circumferential extent corresponding to the spaces between the various sections of armature-coil when connected and operating for non-synchronous action. These larger segments of commutator are made of larger extent than the smaller ones, because the spaces between the subdivisions of any coil included between one pole N and the next pole S are smaller than the space between the last coil or subdivision in the space between said poles and the first coil or subdivision in the subdivided space between one of said poles and the next pole. In other words, the size of the commutator-segments is made to correspond to the spacing of the armature coils or windings to which said commutator-segments are connected. The small and large segments are used in the winding, just as if they were all of uniform size and the coils were uniformly spaced throughout the whole circumference of the armature. The drawing shows in skeleton merely the beginning of the winding, as the manner of completing the same by continuing throughout the whole periphery of the armature is well understood in the art, and the drawing is intended to merely indicate one well-known kind of winding, known as the "closed-circuit" winding. Starting with the end $l$ of a smaller coil or subdivision a space next to the pole N is filled with said coil and connection made to a correspondingly-numbered smaller segment of the commutator. Starting with the same segment of the commutator and skipping one of the main spaces, as indicated, the smaller space next the succeeding pole N is filled and connection made with the proper segment of the commutator, as shown. In the same manner the smaller spaces next each large pole N are filled, after which the winding is continued by filling the next smaller spaces around the whole armature in a similar way, and after completing the circuit of the armature the operation is continued with the third space, and so on until every other main-coil space is filled. The winding is then continued to fill the intermediate main spaces in a well-known manner, connection being made with the commutator after the manner of a Gramme winding.

When the machine is run as a non-synchronous motor, it will be understood that by the proper switching appliances the circuit is turned into the commutator, so that the current will travel through the commutator and the winding, much after the fashion of a Gramme machine. When the machine is used as a synchronous motor, the connection through the commutator is broken and the connection through the armature-coils being made by the usual collecting-rings which are connected, respectively, to two of the larger segments N' S', the circuit is then from a ring to one of such segments, then to the beginning of the series of coils wound in the space between two pole-pieces N S through said series to the coil or series of coils wound in the space between one of said poles and the next adjoining pole, and so on through the coils, each coil being taken as all the wire wound in the space between any two adjoining poles N S to the coil which is connected to the other larger segment of the commutator, and thence to the other continuous ring. In this operation it will be obvious that no current can follow through the other segments or coil-connections if the commutator-brushes are out of contact with the commutator-segments. To permit them to be thrown out of contact, they are mounted, as will be presently described.

The commutator-segments being spaced, as shown, and brushes O O' applied to bear simultaneously on any two commutator-segments of opposite polarity, as indicated in Fig. 6, it will be obvious that if alternating current be passed through the series of coils $a^2$ and then through the commutator and armature-coils subdivided into sections, as described, the armature will be given a constant torque irrespective of the rapidity of the alternations or the speed of revolution of the armature, the action being, as well known, due to the simultaneous reversal of the polarity of armature and field-poles through the alternation of the current fed through them and the commutator operating to reverse the circuits at the proper time to give continuous torque as the armature changes position with relation to the field-poles.

In the synchronous operation of the motor the coils of the armature are used without the commutator, and all of the smaller coils wound in the spaces between each adjoining pair of large poles N S operate together in series as a single coil. Connection with the coils for this purpose may be made through the usual continuous rings and brushes, the rings being individually connected with the armature-circuit by attachment to any pair of larger commutator-segments N' S' of opposite sign. By preference the rings are connected to segments diametrically opposite one another, so as to pass the alternating current through the coils operating as synchronous armature-coils in two branches or divisions. This connection of the rings with the segments N' S' is indicated more clearly in the diagram Fig. 7, where the rings themselves are indicated by the letters C C'.

Figures 5, 7:
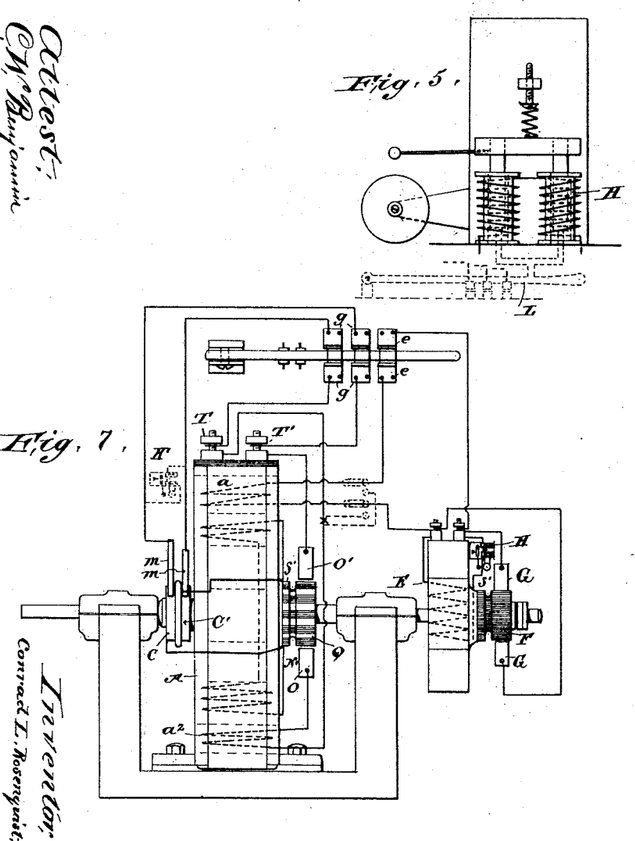
Fig. 5 illustrates a form of magnet that may be employed for indicating by signal when the desired speed has been attained.
Fig. 7 is a general diagram of the circuits of the apparatus.

The excitation of the machine when operating synchronously is maintained by an exciter of any suitable character, the armature-core of which (indicated at D) may be mounted on the main shaft of the machine and revolve in the field produced by any suitable field-magnet coils E. The exciter is by preference a shunt-wound machine, as indicated in Fig. 7. F is the commutator-cylinder on said machine, and G G the brushes.

Figure 8:
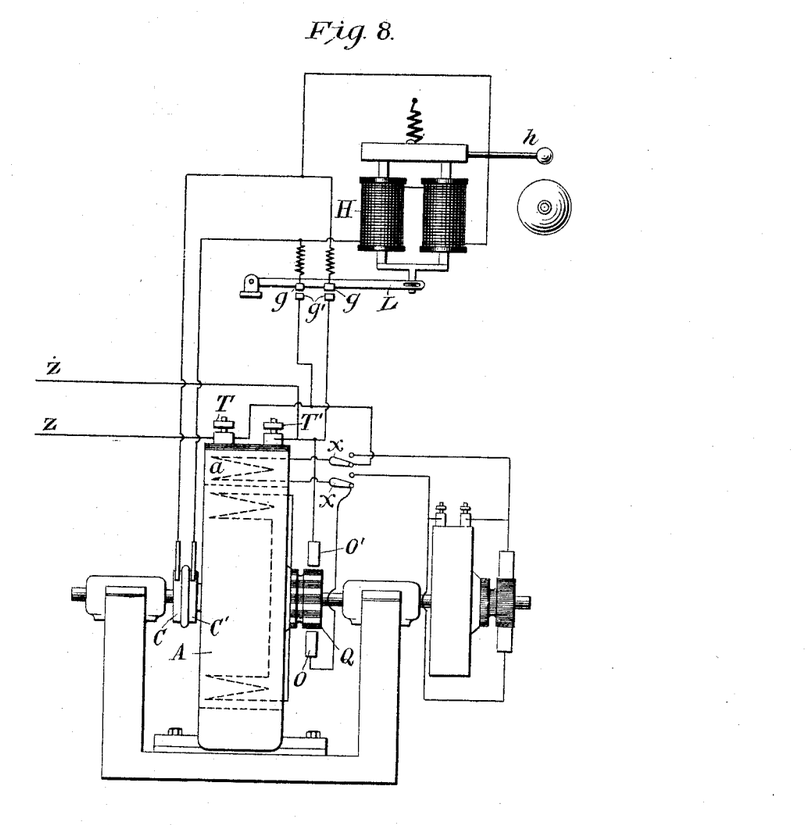
Fig. 8 is a diagram illustrating modifications in circuits and their connections.

H is the electromagnet that serves to indicate when synchronism is reached or which serves to operate upon the switch or upon the other appliances which change the condition of the motor from non-synchronous to synchronous. As shown in the diagram Fig. 7, the electromagnet H is included in the circuit with the field-magnet coil of the exciter, through which the current developed by the armature of said exciter flows while the alternating-machine is reaching the desired critical or synchronous speed. The armature or equivalent portion of said magnet H carries a bell-hammer $h$, and the said magnet is so adjusted that the armature of the machine must reach the desired critical speed before sufficient current will pass through the electromagnet H to overcome the retractor. When the desired speed is reached, however, the electromagnet H operates, and thereby gives a signal to the ear or eye of the attendant, who thereupon operates the devices for changing the circuits of the machine or otherwise putting it into the desired condition for normal synchronous operation. As indicated in Figs. 5 and 8, however, the armature or equivalent portion of the magnet might operate on the lever L, which is, as will be presently described, the switch-lever and which also operates upon the commutator-brushes of the non-synchronous portion of the machine to throw them out of contact with their commutator-cylinder.

O O' indicate the brushes of the commutator for the non-synchronous portion of the apparatus. The brushes are mounted upon independent levers P P' and are insulated from one another either by insulation of the levers or, as shown in the drawings, by proper insulation of the brushes themselves from their holder. The levers P P' are adapted for operation to permit the brushes to be thrown out of contact with the commutator-cylinder hereinbefore referred to as employed for starting the motor and which is indicated by the letter Q.

L is a lever for acting on the levers P P' to throw the brushes out of contact with the cylinder Q. For this purpose the lever L carries suitable pins, (indicated at 1,) which engage with the curved lower ends of the levers P P'. The lever L also operates by preference as a switch-lever, serving at contacts $e$ to complete the connection from the terminals of the exciter-machine to the exciter-coils $a$ of the field-magnet of the alternating-current motor, as indicated in the diagram Fig. 7. By bridging contacts $g$ the said switch-lever completes the connection between the poles of an alternating-current source and the brushes M, which bear upon the collector-rings C C', through which the said alternating currents are delivered to the armature-coils when the machine runs as a synchronous motor. For this purpose the switch is connected, as shown, with the main binding-posts T T' of the machine, said binding-posts being those which are connected with any source of alternating current, (whence lead the conductors Z Z, Fig. 8.) The said binding-posts also connect, as shown, with the brushes O O' of the non-synchronous motor.

The general operation of the apparatus is as follows: Before the motor is started the lever L, which operates on the commutator-brushes and the switch, as described, is up and the brushes O O' make connection with the commutator-cylinder Q. The exciter is disconnected from the coils $a$; but the coils $a^2$ are in the connection from the main binding-posts T T', as indicated in the diagram, the circuit being from post T', commutator-brush O', through the armature, thence to brush O and through the coils $a^2$. When the alternating current is turned onto the machine, the motor operates as a non-synchronous motor through the combined action of the coils $a^2$ and the several coils upon the main armature, in which current is properly commuted by the commutator Q, and as the action is one with a continued torque irrespective of the speed the motor accordingly acquires speed. In this operation the exciter begins to develop current, and when the desired critical speed or speed proper for synchronous operation is reached the magnet H operates, as before described, and thereupon the lever L is operated either by the attendant or directly or indirectly by the magnet H. The effect of operating the lever L is, obviously, to connect the exciter by contacts $e$ of the switch with the main coils $a$ of the alternating-current motor, and the exciter then furnishes a continuous current to said coils $a$ and maintains in the field-poles the desired continuous polarity for synchronous operation of the motor when an alternating current is supplied to the armature-coils. The lever L, also by the contacts $g$, connects the main alternating-current source direct to the armature-coils, and alternating current flows through the said coils in the two branches, as described, to develop poles N S, the coils in each branch being connected in series with one another. The motor being at speed, it maintains its speed by reason of the fact that the polarity of the poles N S is by the alternations of current reversed synchronously with the passage of the armature and field-poles by one another. By the operation of the lever L the brushes O O' are removed from contact with the commutator-cylinder Q, thus disconnecting the non-synchronous circuits or portions of the motor system. By this means the commutator O is relieved of wear, as this part of the apparatus is that peculiarly subject to sparking. The only commutator maintained in operation is that of the exciter, in which the brushes maintain a constant position, and there is but little wear.

It will be obvious that the electromagnet H might be placed in a circuit formed through other parts of the apparatus, so as to be affected by a current varying with the speed of the motor while operating as a non-synchronous motor, the said magnet being at the same time adjusted, as before described, to operate when the critical or desired synchronous speed is reached. Thus, for instance, it might be placed as indicated in the dotted lines in the diagram Fig. 7 and in full lines, as in Fig. 8, in the connection across the two brushes which bear upon the rings C C', being thereby placed in connection as a shunt to the alternating armature-currents employed in causing the non-synchronous operation.

As is well understood, when the motor reaches the synchronous speed the current flowing from the commutator will be a continuous current or current of one polarity. Up to the time that the motor reaches such speed an alternating current will flow in the branch through the magnet H; but the reaction or self-induction of said magnet will operate to prevent much current flowing, and also the said magnet will not so readily respond under the effect of said alternations. When, however, the continuous current, which corresponds to the synchronous speed, flows in said magnet, the said magnet will act or respond, and the motor may then be changed to the condition for action as a synchronous motor.

While I have described the use of separate field-coils for the machine when operating as a synchronous motor and a non-synchronous motor, it will be readily understood that my invention is not limited to the employment of separate coils for such purpose, but that the same coils might be employed under both conditions. This I have indicated in the diagram by the switches X X, (shown in dotted lines in Fig. 7 in the connections to the exciter and in full lines in Fig. 8.) These two switches are shown as respectively in the connections from the two ends of the series of coils $a\ a$ to the two terminals of the exciter and as serving to complete the connection by resting on suitable contacts. They are also shown as provided with contacts connected, respectively, (see dotted lines, Fig. 7,) to the opposite sides of a break in the alternating-current wire leading from main post T to the set of coils $a^2$. Assuming that said coils $a^2$ are not used, but that the connection is directly to the brush O, Fig. 8, it is obvious that by turning the switches the coils $a$ or similar suitable coils could be disconnected from the exciter and placed in the same position in the circuits that coils $a^2$ occupy, while by turning said switches to their other position the said coils $a$ or similar coils would be taken out of the circuit of the commutator Q and armature and placed directly in connection with the exciter.

While I have hereinbefore described the coils of the synchronous motor as used also for the purpose of a non-synchronous motor system in the operation of starting, it will be understood that some of the features of my invention are applicable not only to such style of alternating-current motor, but to other styles wherein other coils than those of the synchronous motor are used for the starting or non-synchronous operation.

What I claim as my invention is—

1. The combination with a synchronous single-phase alternating-current motor organized to operate as a starting or non-synchronous motor, wherein the current flows through both the armature and field coils, of a magnet in a circuit carrying current responsive to or varying with the speed of the motor, and a circuit-closer in the synchronous motor-coils adjusted to be closed by said magnet when the critical or desired synchronous speed is reached.

2. The combination in an alternating-current motor, of a circuit for non-synchronous or starting operation wherein the current flows through both the armature and field coil, a circuit for synchronous operation, an exciter for the synchronous operation, a magnet in the circuit of the exciter, and a circuit-closer in the exciting-circuit for putting the motor into operation as a synchronous motor and adjusted to close when the critical or desired speed of the motor is reached.

3. The combination, substantially as described, of a synchronous alternating-current motor, a commutator for coils thereof which operate as synchronous motor-coils, means for throwing off the commutator-brushes when the motor has reached the desired speed under the action of said coils operating as non-synchronous motor-coils, and a switch for connecting the said coils with an uncommuted alternating-current circuit.

4. In a synchronous motor, the combination with a field-circuit, of an armature having its coils for synchronous action subdivided, a commutator to the segments of which the subdivisions of said coils are connected for non-synchronous or starting operation, means for interrupting the circuit through the commutator, and switch devices for completing a direct-current circuit through the field of the machine and an alternating-current circuit through the armature both said circuits being independent of said commutator.

5. An armature for a synchronous motor, having its coils for synchronous operation subdivided and wound in spaces between small polar projections intermediate the larger polar projections which act as the effective poles while the motor is running at synchronous speed.

6. An armature for a synchronous motor, having poles for synchronous operation the same in number as the field-poles and provided with one or more intermediate poles on its armature for non-synchronous action, as and for the purposes described.

7. The combination in an alternating-current motor, of field-coils in an alternating-current circuit and in series with the armature for starting or non-synchronous operation, a source of continuous-current supply independent of the armature-circuit, and a switch for connecting said coils to said source during synchronous operation.

8. The combination in a synchronous alternating-current motor, of a field-magnet, armature-coils for synchronous operation having connection to a commutator for non-synchronous or starting operations and to rings or their equivalents for synchronous action, and means for disconnecting or opening the circuit through said commutator during synchronous action.

9. In an alternating-current motor, the combination, substantially as described, of synchronous motor-coils subdivided for non-synchronous operation, a commutator connected to said coils, means for keeping the circuit of said commutator broken during synchronous operation, and means for connecting the said armature-coils direct with an alternating-current circuit, as and for the purpose described.

10. In an alternating-current motor provided with circuits and connections for non-synchronous and synchronous operation, the combination, substantially as described, of synchronous armature-coils having means for connecting directly with an alternating-current circuit, a commutator also connected to said coils, brushes therefor an exciter driven by the armature, means for connecting said exciter to field-coils when synchronism is reached, and means for breaking the non-synchronous circuit through the brushes and commutator.

11. A multipolar alternating-current motor whose armature is provided with a single winding serving both as a winding for non-synchronous and synchronous operation, those sections of the winding which are located nearest the poles of the armature which are employed in the synchronous operation being separated from one another by a greater distance than from other adjoining sections.

12. In an alternating-current motor, the combination with the synchronous operating-coils and means for connecting the same direct to an alternating-current circuit, of connections from the same coils to a commutator whereby the motor may be operated as a non-synchronous motor, and means for throwing off the brushes of said commutator when synchronism is attained.

13. The combination in an alternating-current motor, of a brush-operating lever and a switch actuated by said lever and controlling the circuits of the synchronous portion of the motor, as and for the purpose described.

14. The combination with a single-phase alternating-current motor, organized to start under the action of said currents flowing through both field and armature, of a separate exciter operated by said motor and normally disconnected from a field-circuit of the machine, and a switch for closing the circuit of said exciter when synchronous speed is attained.

15. The combination in an alternating-current motor, of an armature having connections to a commutator for non-synchronous or starting action, a switch for changing the circuits of the apparatus to condition for synchronous operation, and means for simultaneously operating said switch and throwing said commutator out of action while at the same time completing the connection for an exciting-circuit independent of said commutator.

16. The combination with a synchronous alternating-current motor having a starting or non-synchronous circuit provided with a commutator, of means for throwing the brushes of the latter out of action automatically when synchronism is attained and holding them out of action during synchronous operation.

Signed at New York, in the county of New York and State of New York, this 13th day of June, A. D. 1893.

CONRAD L. ROSENQVIST.

Witnesses:
   WM. H. CAPEL,
   THOS. F. CONRELL.